United States Patent
Thienel et al.

(10) Patent No.: US 10,773,574 B2
(45) Date of Patent: Sep. 15, 2020

(54) CARRIER DEVICE FOR A MOTOR VEHICLE

(71) Applicant: BROSE FAHRZEUGTEILE GMBH & CO. KOMMANDITGESELLSCHAFT, BAMBERG, Bamberg (DE)

(72) Inventors: Michael Thienel, Thurnau (DE); Michael Bernert, Redwitz (DE); Matthias Fischer, Itzgrund (DE); André Lehnhardt, Eltmann (DE); Norman Hümmer, Ebensfeld (DE); Michael Jahn, Baunach (DE); Hans Herzog, Strullendorf (DE); Gerhard Hofmann, Bamberg (DE); Raimund Aschmutat, Grub am Forst (DE); Werner Stammberger, Grub am Forst (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 0 days.

(21) Appl. No.: 15/565,396

(22) PCT Filed: May 3, 2016

(86) PCT No.: PCT/EP2016/059913
§ 371 (c)(1),
(2) Date: Oct. 9, 2017

(87) PCT Pub. No.: WO2016/177742
PCT Pub. Date: Nov. 10, 2016

(65) Prior Publication Data
US 2018/0117999 A1    May 3, 2018

(30) Foreign Application Priority Data

May 5, 2015 (DE) .................. 10 2015 005 885
Sep. 10, 2015 (DE) .................. 10 2015 217 353

(51) Int. Cl.
*B60J 5/04* (2006.01)
*B29C 45/16* (2006.01)

(52) U.S. Cl.
CPC ......... *B60J 5/0416* (2013.01); *B29C 45/1671* (2013.01); *B60J 5/042* (2013.01);
(Continued)

(58) Field of Classification Search
CPC ...... B60J 5/0481; B60J 5/0413; B60J 5/0416; B60J 5/0463; B60R 13/0212;
(Continued)

(56) References Cited

U.S. PATENT DOCUMENTS 4,364,591 A * 12/1982 Bien .................. B60R 19/445
293/102
4,923,542 A * 5/1990 Janicki .................. B60J 5/0416
156/249

(Continued)

FOREIGN PATENT DOCUMENTS

CN    1241500 A    1/2000
CN    1243076 A    2/2000
(Continued)

OTHER PUBLICATIONS

Japanese Decision of Grant for Japanese Application No. 2017-557446 dated Apr. 9, 2019, 3 pages.

(Continued)

*Primary Examiner* — Gregory A Blankenship
(74) *Attorney, Agent, or Firm* — Lewis Roca Rothegerber Christie LLP

(57) ABSTRACT

It is provided a carrier device for a motor vehicle having a base carrier which is substantially formed by an organo sheet and which extends along a main plane. The base carrier has at least one separation on which a material region is molded out from the main plane while forming at least one free space, such that said material region is spaced apart from an adjacent region of the base carrier by at least one portion, wherein the at least one free space is at least partially filled with an injection of thermoplastic material and/or with a separate insert element, such that the portion of the molded-out material region and the adjacent region are connected to one another thereby.

22 Claims, 10 Drawing Sheets

(52) U.S. Cl.
CPC .......... *B60J 5/0418* (2013.01); *B60J 5/0425* (2013.01); *B60J 5/0426* (2013.01); *B60J 5/0455* (2013.01); *B60J 5/0463* (2013.01); *B60J 5/0481* (2013.01); *B60J 5/0484* (2013.01)

(58) Field of Classification Search
CPC ........ B60R 13/0243; B60R 2013/0287; B29C 45/14336; B29C 45/14377; B29C 45/14467; B29C 45/14475; B29C 45/1671; B29L 2031/3041
USPC ...... 296/146.2, 146.5–146.7, 152, 39.1, 214; 49/502
See application file for complete search history.

(56) References Cited

U.S. PATENT DOCUMENTS

| | | | |
|---|---|---|---|
| 5,190,803 A | 3/1993 | Goldbach et al. | |
| 5,298,694 A * | 3/1994 | Thompson | B32B 5/26 181/286 |
| 5,482,343 A * | 1/1996 | Bradac | B60J 5/0418 296/39.1 |
| 6,123,385 A * | 9/2000 | Bailey | B60J 5/0416 296/146.7 |
| 6,874,279 B1 | 4/2005 | Weber et al. | |
| 8,870,262 B2 * | 10/2014 | Seitz | B60J 5/107 296/146.6 |
| 2002/0011029 A1 * | 1/2002 | Lawrie | B60J 5/0416 49/502 |
| 2003/0188492 A1 | 10/2003 | Bonnett et al. | |
| 2003/0218356 A1 | 11/2003 | Emerling et al. | |
| 2004/0049989 A1 | 3/2004 | Florentin et al. | |
| 2005/0200159 A1 | 9/2005 | Eckhart et al. | |
| 2006/0248834 A1 * | 11/2006 | Heyer | B60J 5/0416 52/455 |
| 2007/0006536 A1 * | 1/2007 | Youngs | B60J 5/0416 49/502 |
| 2007/0046064 A1 * | 3/2007 | Winborn | B60J 5/0418 296/146.7 |
| 2007/0062123 A1 | 3/2007 | Kruger et al. | |
| 2007/0126259 A1 * | 6/2007 | Almeida | B60J 5/0416 296/146.1 |
| 2010/0084887 A1 | 4/2010 | Kruger et al. | |
| 2010/0084888 A1 | 4/2010 | Ishitobi et al. | |
| 2011/0078957 A1 | 4/2011 | Deschner | |
| 2012/0036780 A1 | 2/2012 | Pleiss et al. | |
| 2012/0241999 A1 | 9/2012 | Kroner | |
| 2013/0057018 A1 | 3/2013 | Reese | |
| 2014/0361576 A1 | 12/2014 | Storgato et al. | |
| 2015/0047264 A1 | 2/2015 | Kobayashi | |
| 2016/0056511 A1 | 2/2016 | Schmid et al. | |
| 2016/0059678 A1 * | 3/2016 | Tamaoki | B60J 5/0416 49/501 |
| 2016/0136870 A1 | 5/2016 | Thienel et al. | |
| 2017/0297418 A1 * | 10/2017 | Makino | B60J 5/0419 |
| 2018/0001749 A1 * | 1/2018 | Costigan | B60J 5/0411 |
| 2018/0134130 A1 * | 5/2018 | Nagaishi | B60J 5/0481 |
| 2019/0001902 A1 * | 1/2019 | Kern | B60R 13/0243 |
| 2019/0126854 A1 * | 5/2019 | Creet | B60R 13/0212 |

FOREIGN PATENT DOCUMENTS

| | | |
|---|---|---|
| CN | 1424958 A | 6/2003 |
| CN | 1659051 A | 8/2005 |
| CN | 104169115 A | 11/2014 |
| CN | 105377523 A | 3/2016 |
| DE | 29808833 U1 | 8/1998 |
| DE | 19804781 A1 | 8/1999 |
| DE | 199 44 916 A1 | 3/2001 |
| DE | 10052739 A1 | 5/2002 |
| DE | 10133421 A1 | 1/2003 |
| DE | 102005033115 A1 | 1/2007 |
| DE | 102006037157 A1 | 3/2007 |
| DE | 102006002436 A1 | 7/2007 |
| DE | 102006017424 A1 | 10/2007 |
| DE | 202006018071 U1 | 5/2008 |
| DE | 102008024742 A1 | 11/2009 |
| DE | 102009039498 A1 | 1/2011 |
| DE | 102009040901 A1 | 3/2011 |
| DE | 102010014510 A1 | 10/2011 |
| DE | 102010053381 A1 | 6/2012 |
| DE | 102012023588 A1 | 7/2013 |
| DE | 102013001943 A1 | 3/2014 |
| DE | 202012104145 U1 | 3/2014 |
| DE | 102013210094 A1 | 10/2014 |
| DE | 102013213711 A1 | 1/2015 |
| EP | 0370342 A2 | 5/1990 |
| EP | 1275540 B1 | 1/2003 |
| EP | 1486366 A2 | 12/2004 |
| EP | 0 955 191 B1 | 4/2005 |
| EP | 2272706 B1 | 12/2013 |
| JP | 7-13535 | 3/1995 |
| JP | 2001-503696 | 3/2001 |
| JP | 2008-254471 | 10/2008 |
| JP | 2012-520198 | 9/2012 |
| JP | 2013-107521 A | 6/2013 |
| JP | 2014-184765 A | 10/2014 |
| JP | 2015-209146 A | 11/2015 |
| JP | 2009-154580 A | 7/2016 |
| JP | 2016-153235 | 8/2016 |
| WO | WO 99/39931 | 8/1999 |
| WO | WO 99/59833 | 11/1999 |
| WO | WO 01/39952 A1 | 6/2001 |
| WO | WO 2008/061906 | 5/2008 |
| WO | WO 2010/135562 A2 | 11/2010 |

OTHER PUBLICATIONS

Japanese Decision of Grant for Japanese Application No. 2017-557448 dated Apr. 16, 2019, 3 pages.
Japanese Decision of Grant for Japanese Application No. 2017-557449 dated Apr. 16, 2019, 3 pages.
European Examination Report cited in corresponding EP Application No. 16 720 417.1-1015 dated Dec. 18, 2018, 4 pages, with English Translation, 2 pages.
English Translation of CN Office action dated Nov. 28, 2019 cited in corresponding CN Application No. 201680026362.5 submitted on Jan. 10, 2020, 2 pages.
Chinese Office action dated Jan. 6, 2020 issued in corresponding CN Application No. 201680025997.3, 8 pages, with English translation, 2 pages.
CN Office action dated Nov. 28, 2019 cited in corresponding CN Application No. 201680026362.5, 6 pages.
CN Office action dated Dec. 2, 2019 cited in corresponding CN Application No. 201680026352.1, 8 pages, with English translation, 4 pages.

* cited by examiner

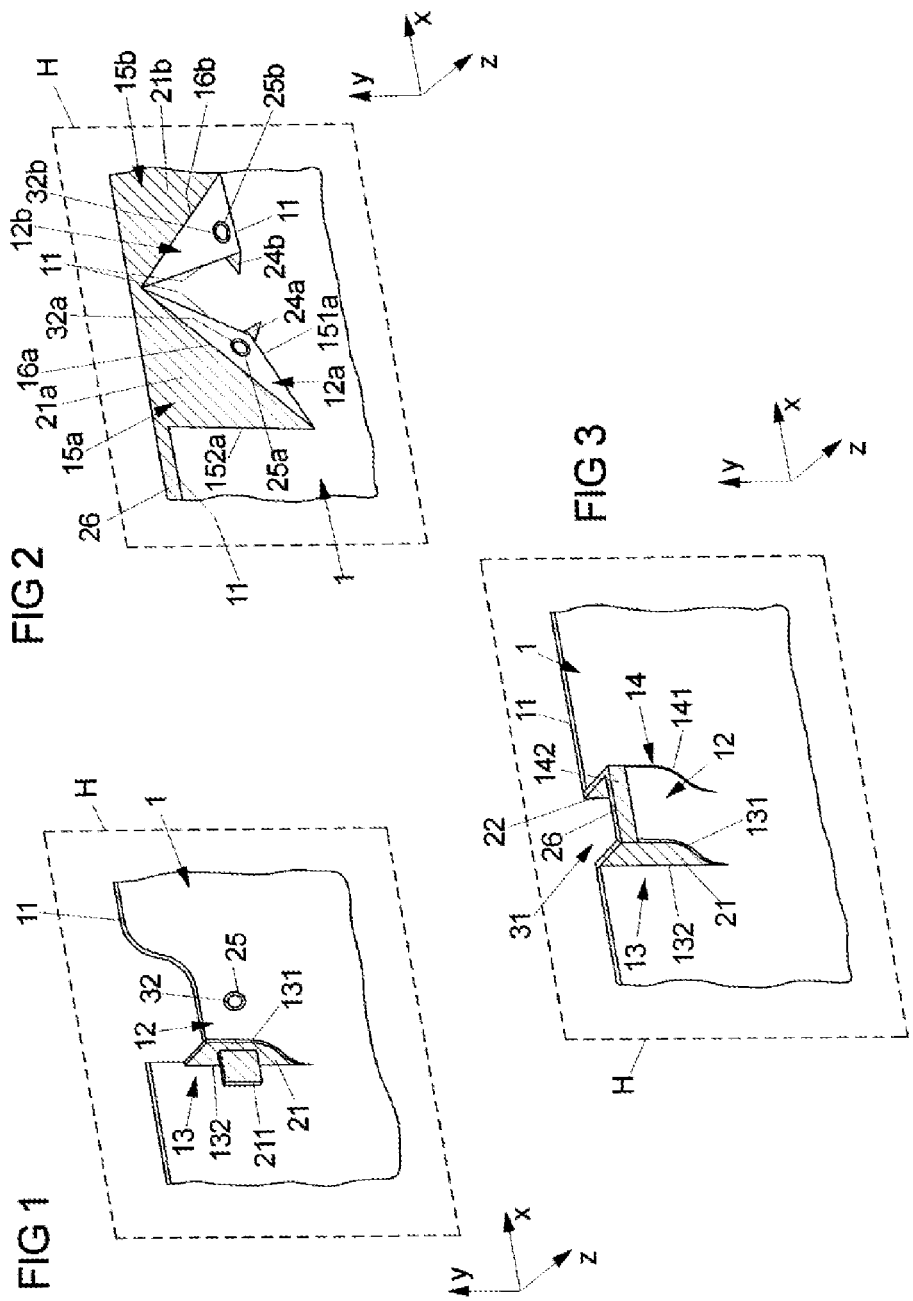

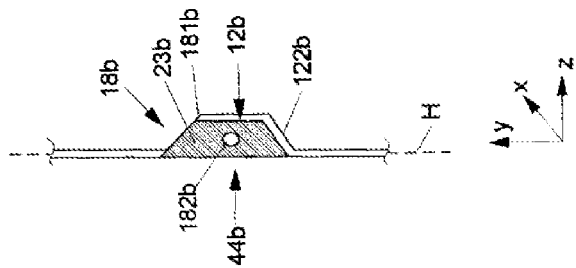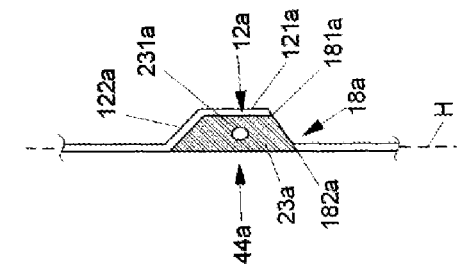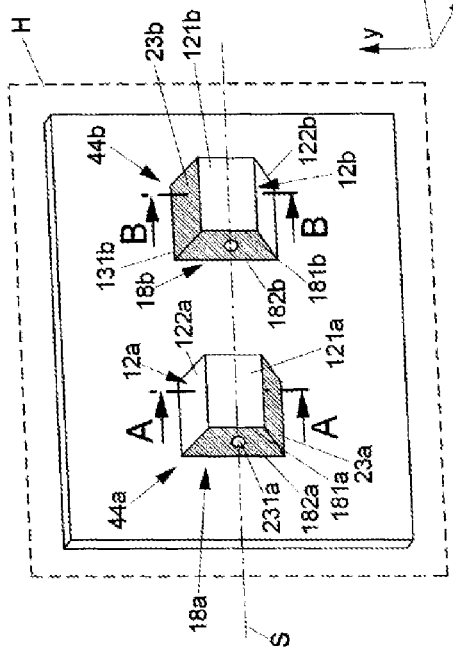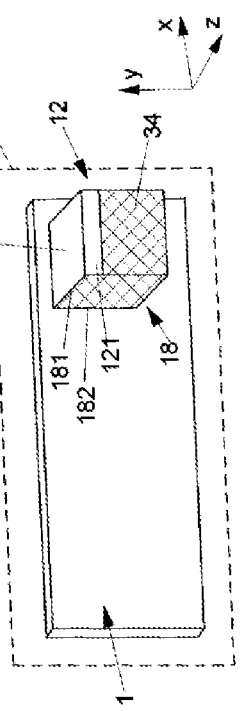

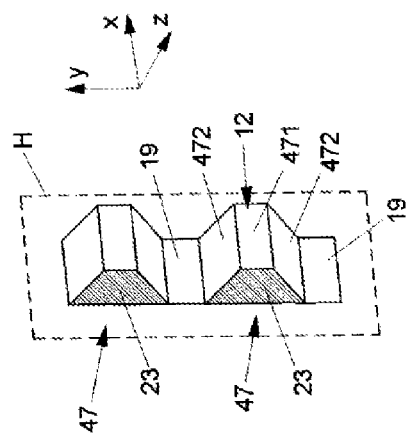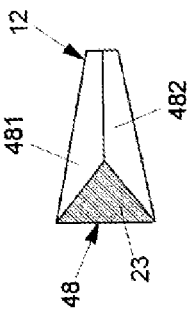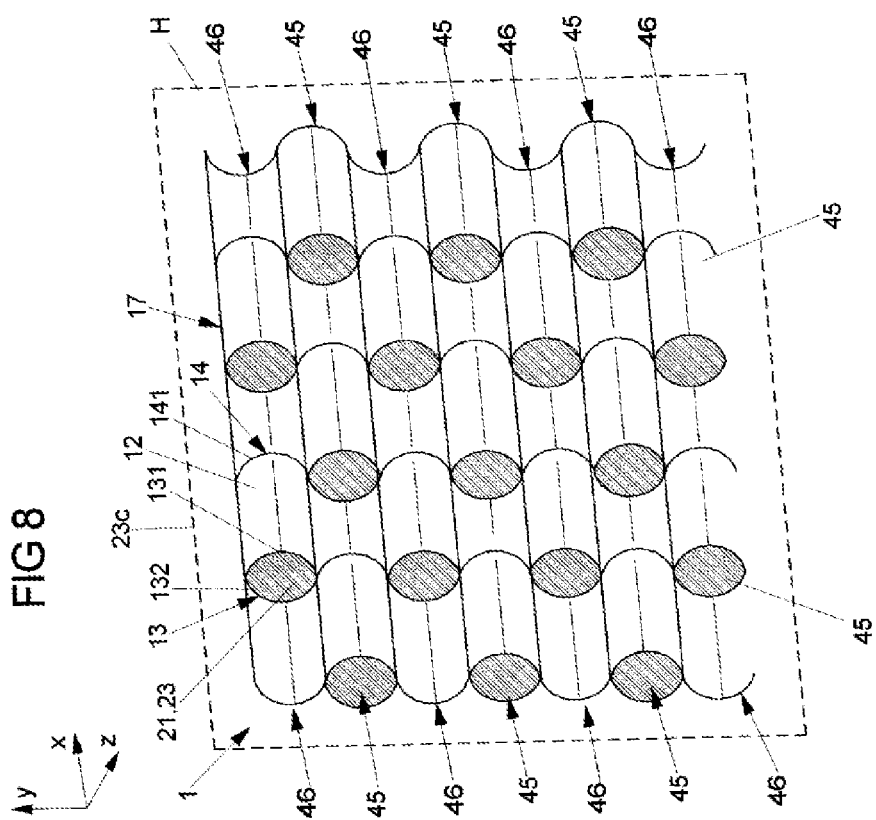

FIG 10
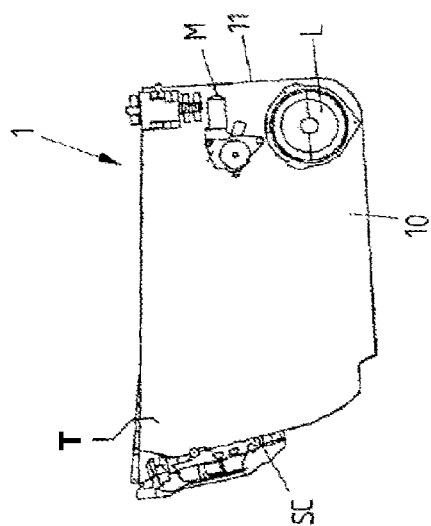
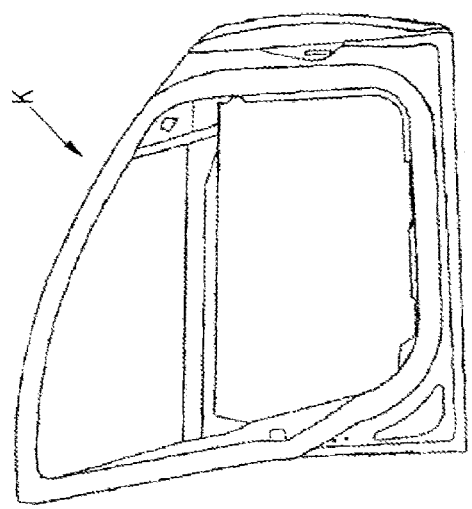

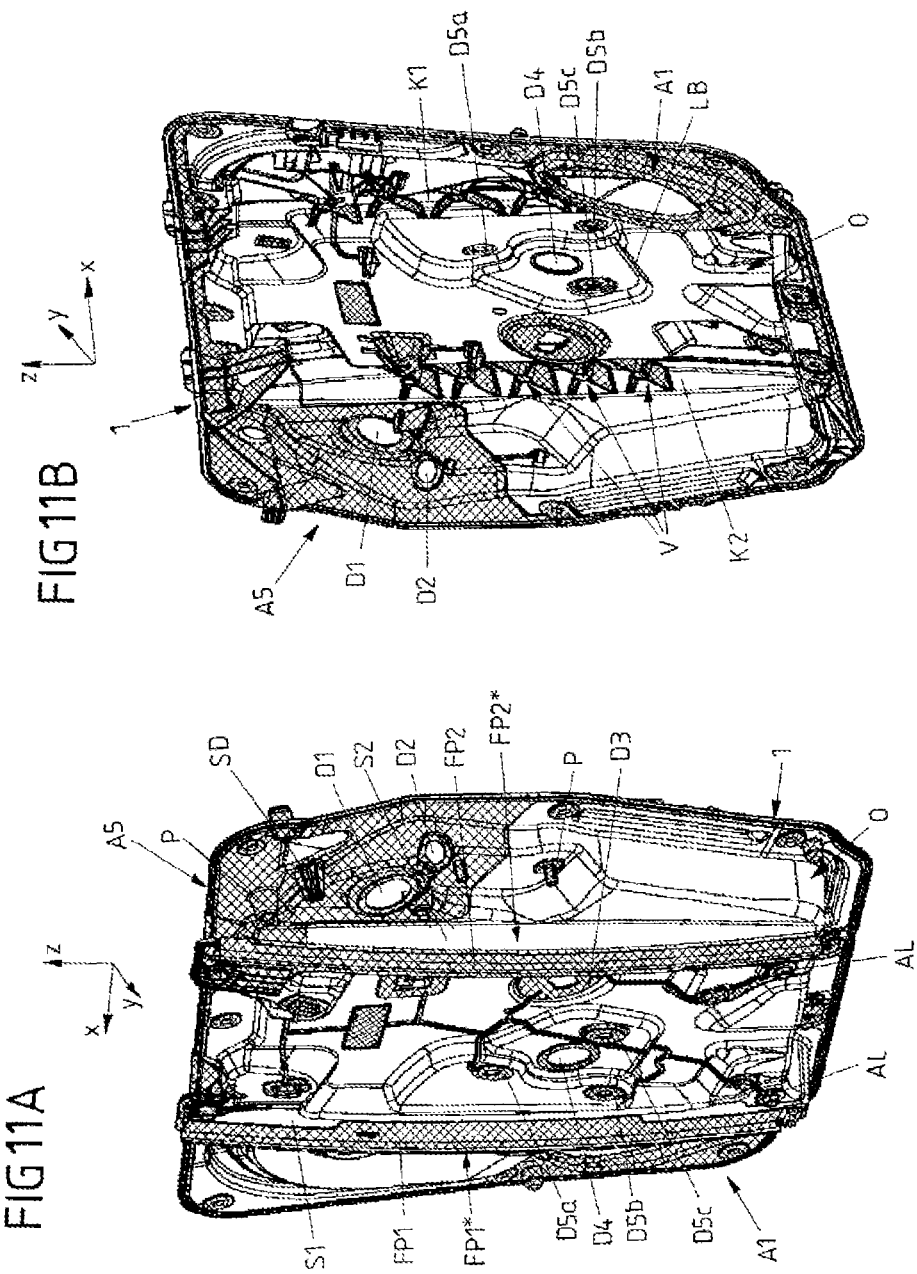

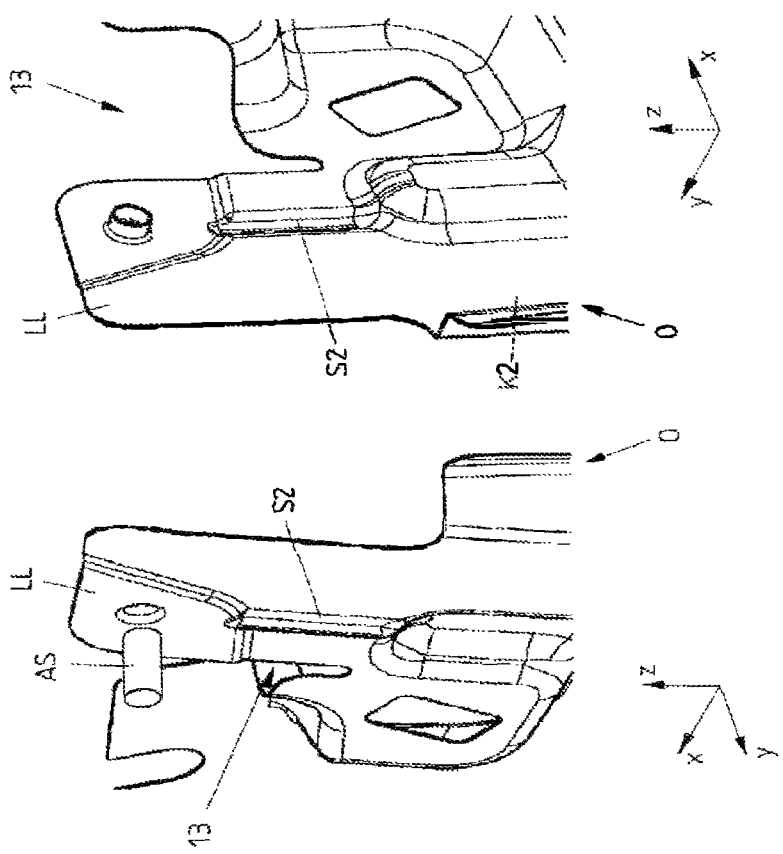

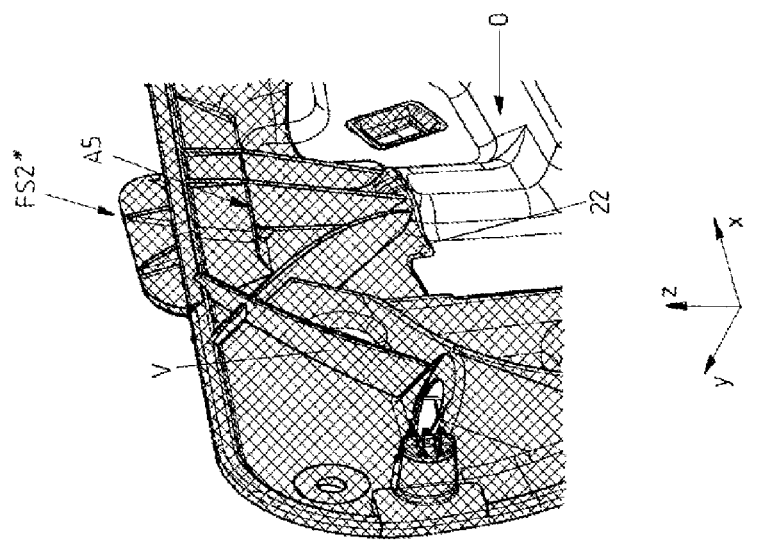
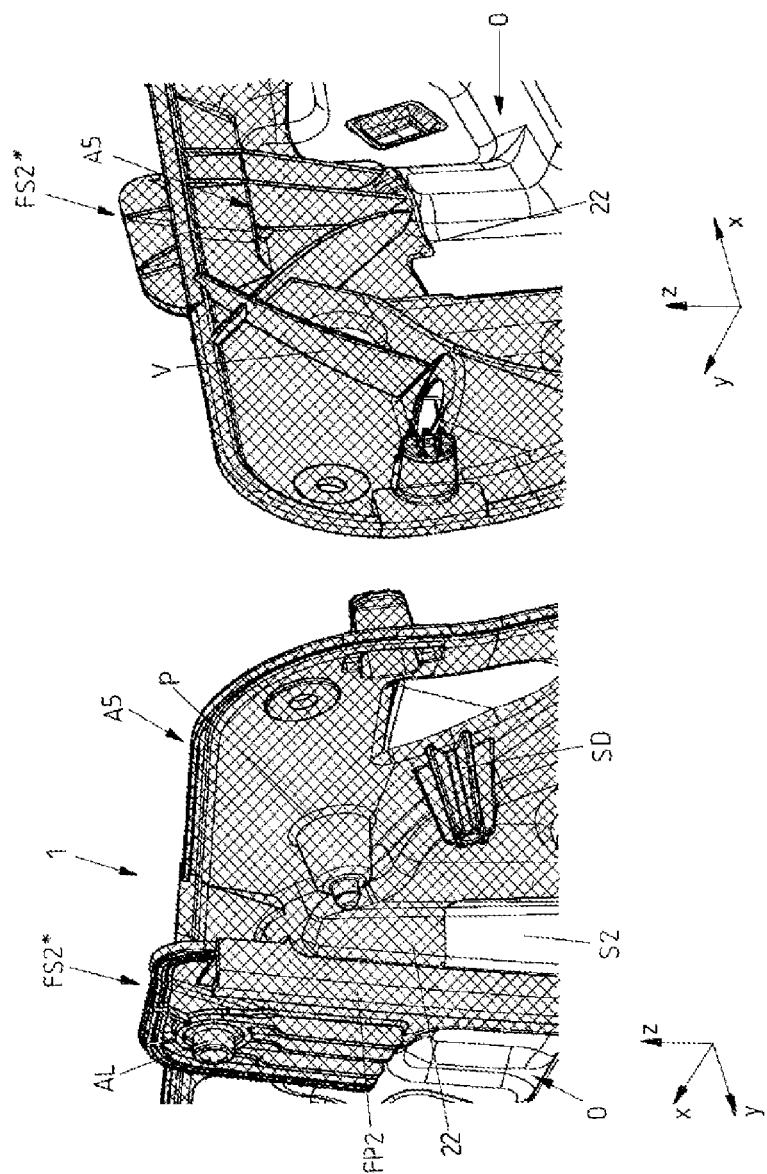

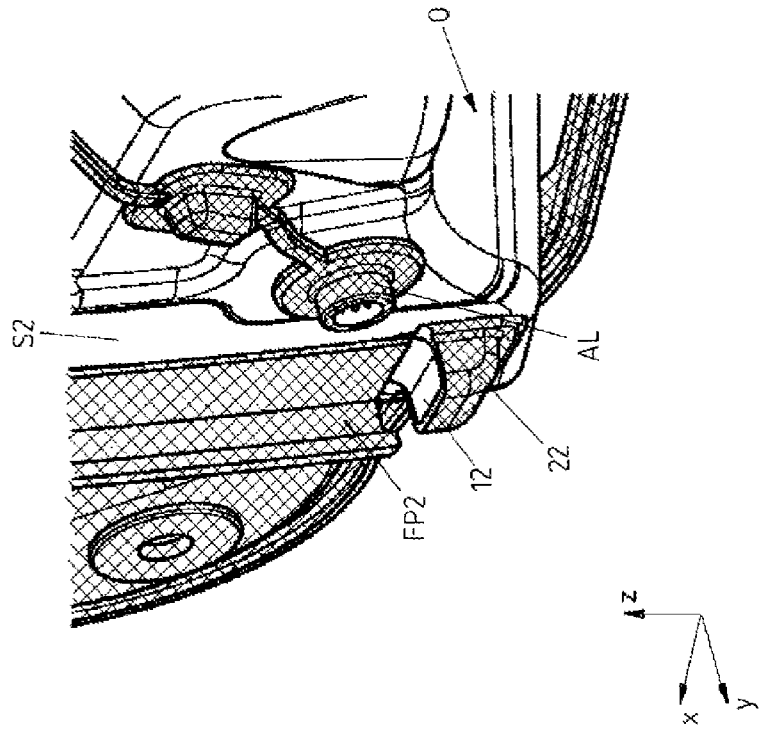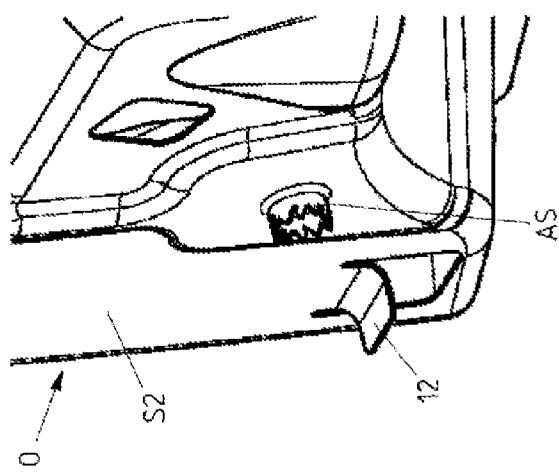

CARRIER DEVICE FOR A MOTOR VEHICLE

CROSS-REFERENCE TO A RELATED APPLICATION

This application is a National Phase patent application of International Patent Application Number PCT/EP2016/059913, filed on May 3, 2016, which claims priority of German Patent Application Number 10 2015 005 885.1, filed on May 5, 2015 and of German Patent Application Number 10 2015 217 353.4, filed on Sep. 10, 2015, the contents of all of which are incorporated herein by reference.

BACKGROUND

The present invention relates to a carrier device and a production method.

A generic carrier device for a motor vehicle has a base carrier which is substantially formed by an organo sheet and which extends along a main plane. For example, in a carrier device for a motor vehicle door functional elements, such as for example functional elements of a window lifter or a lock, are secured to such a carrier device and, in particular, the base carrier thereof. The base carrier in this case may be configured, for example, by a plate-shaped semi-finished product which consists of an organo sheet. The organo sheet is an endless fiber-reinforced thermoplastic material, the endless fibers in the form of laid, woven or knitted fibers consisting of glass fibers, Kevlar fibers, carbon fibers or plastics fibers being embedded in a thermoplastic matrix. Polyamide, for example, is suitable as the thermoplastic material for the matrix due to its good properties of adhesion to the fibers. By the term "endless fiber-reinforced" is to be understood that the length of the fibers serving for the reinforcement is substantially defined by the size of the plate-shaped organo sheet. Thus a fiber is generally not discontinuous inside the organo sheet.

Since the base carrier is substantially formed by an organo sheet, this means that the organo sheet forms that part of the base carrier which is substantially subjected to the forces which are present under normal operating conditions. In this case, the base carrier is a door module of a motor vehicle door, for example the part of the base carrier on which one or more guide rails of a window lifter are provided. A part of the base carrier (for example linking together and bearing one or more guide rails) made of an organo sheet or a plurality of parts of the base carrier (for example bearing one or more guide rails) made of an organo sheet extend, for example, over approximately 30% or more of the surface of the base carrier.

In principle, therefore, the organo sheet may extend over more than 30%, in particular over more than 40%, and generally over at least 50% of the surface of the base carrier so that the organo sheet, therefore, also forms a corresponding proportion of more than 30%, in particular more than 40%, or approximately 50% or more of the surface of the base carrier in the main plane defined thereby. In order to utilize fully the advantages of the strength of the organo sheet, generally attempts are made to maximize the proportion of the organo sheet on the surface of the base carrier. A multipart embodiment of the organo sheet on a base carrier is not excluded here.

A main component of the base carrier, for example, is a plate-shaped semi-finished product which consists of an organo sheet. Thus the organo sheet defines a substantially flat extent of the base carrier but may be complemented by further components and/or materials. Thus, for example, metal elements and/or plastics elements may be incorporated in the organo sheet or attached to the organo sheet.

Due to the composition of the organo sheet of the base carrier, the possibilities for providing thereon three-dimensional structures by means of shaped portions is limited. For example, due to the endless fiber reinforcement of the organo sheet, locally defined shaped portions may have undesirable effects on regions outside the respectively shaped region. Thus, tensile forces caused by the local shaping of the organo sheet may be carried for relatively long distances through the base carrier due to the fibers. Moreover, the possibilities of three-dimensional structuring by means of thermal shaping in an organo sheet are limited by the flow properties thereof. Thus, three-dimensional structures may be incorporated only to a certain extent by thermal shaping of the organo sheet before damage occurs, such as for example cracks, in the base carrier.

SUMMARY

An object of the invention, therefore, is to provide a carrier device in which three-dimensional structures are able to be formed on an organo sheet of a base carrier in a simple manner and, in particular, substantially without undesirable loading of the adjacent regions.

This object is achieved both by a carrier device having features as described herein and by a production method as described herein.

In a carrier device according to the invention the base carrier has at least one separation on which a material region is molded out from the main plane while forming at least one free space. As a result, at least one portion of the molded-out material region is spaced apart from an adjacent region of the base carrier. The at least one free space formed by molding out the material region is at least partially filled with an injection of thermoplastic material and/or with a separate insert element, such that a portion of the molded-out material region and the adjacent region of the base carrier are connected to one another thereby.

Accordingly, the essential idea of the invention is to form in a simple manner three-dimensional structures in a base carrier which may be adapted to the respective requirement and which is formed substantially from an organo sheet, by material being separated thereon and a material region being molded out from the main plane generated by the base carrier, so that the material region at least partially protrudes from the main plane. In particular, in order to stabilize the material region and/or reinforcement of the three-dimensional structure defined thereby in a simple manner, a free space produced on the separation is at least partially filled with an injection of thermoplastic material and/or with a separate insert element. In particular, a structuring may be provided thereby which is not easily possible simply by shaping the organo sheet of the base carrier and, for example, leads to undesired stresses or deformations and/or cracks in the base carrier. In the solution according to the invention, a region of the base carrier adjacent to the molded-out material region is substantially unaffected by the molding-out, even if the material region, for example, is pressed, pushed, pulled and/or folded out of the main plane.

By means of the separation, the material of the base carrier is separated, for example cut (into), in a region which was originally continuous. As a result, a material region is able to be deformed in a specific manner, a material connection no longer existing between the adjacent edges of the separation, at least in the separated portion on said material region. Regions which are separate from one another are produced by the separation, said regions being able to be formed by specific deformation and substantially independently of one another, for example by bending and/or folding the material of the base carrier, in particular to form a material region on the base carrier protruding from the main plane. In this case, the separation may be implemented in very different forms. In particular, the separation may be implemented in a linear manner so that, as a result, the material region is opened up along a line extending in a linear, wave-shaped or right-angled manner.

The material region defining (with the base carrier) a three-dimensional structure on the base carrier is molded out from the main plane after applying the separation. The subsequent at least partial filling of a free space, produced by the molding-out, with thermoplastic material and/or a separately produced insert element, in this case serves, for example, for stabilizing the molding and the three-dimensional structure defined thereby and/or a seal, so that no moisture is able to enter through the free space. The latter is advantageous, in particular, in a carrier device for a motor vehicle door, in which a wet space is intended to be separated from a dry space by means of the base carrier. According to one embodiment, the free space is thus sealingly closed by the injection of thermoplastic material and/or by the separate insert element. The at least one free space, therefore, may be sealingly closed by the injections and/or the separate insert element such that in a carrier device for a motor vehicle door a wet/dry space separation is not impaired by means of the base carrier.

A carrier device according to the invention may be used in different systems of a motor vehicle. For example, a carrier device may be part of a motor vehicle door of modular construction, in particular a door module, or part of a motor vehicle seat or part of a cooling fan system. A base carrier, on which the material region is formed in the region of a separation of an organo sheet, in this case preferably extends in a planar manner in the main plane. In particular, depending on the purpose of use, additional injections of thermoplastic material may be provided on the base carrier.

Generally, injections of thermoplastic material are designed such that the thermoplastic material is connected at least by a material connection to the base carrier. An injection, however, may also be connected by positive locking to the base carrier. By means an injection, for example, a portion of the base carrier may also be surrounded and/or encapsulated with thermoplastic material. An injection may extend through the base carrier. For example, the injection may be formed by means of a so-called penetrating injection in which the thermoplastic material is injected through the base carrier, in particular through the organo sheet. This includes, in particular, a variant in which the thermoplastic material is pushed through between the fibers of the organo sheet.

The thermoplastic material may comprise, for example, polypropylene.

In one variant, at least two edges spaced apart from one another define the at least one free space which is formed by on the separation and by the molding-out of the material region. In this case, one of the two edges may be assigned to the molded-out material region and the other edge to the adjacent region of the base carrier. For example, the at least one separation on the base carrier forms at least two adjacent edges which are spaced apart from one another at least transversely to the main plane. These edges border the free space which is subsequently at least partially closed. One edge of the separation in this case also forms, therefore, an edge of the material region which is molded-out from the main plane.

In one variant, an edge of the at least one free space is formed by a folded edge. Such a folded edge is produced by bending (over) or folding (over) a base carrier portion which ultimately forms a part of the molded-out material region. The folded edge is formed, for example, by a base carrier portion, which ultimately forms a portion of the molded-out material region, being folded at least once from the main plane retrospectively, i.e. after applying the separation.

Alternatively or additionally, the free space may be defined by at least two edges spaced apart from one another, said edges in each case being spaced apart from the main plane and namely at least in one direction transversely to the main plane.

The injection of thermoplastic material and/or the insert element may fill the at least one free space such that the at least two edges of the at least one free space are at least partially connected together. In this manner, at least two edges of the at least one free space are stabilized relative to one another in their position by the injection of thermoplastic material and/or by the separate insert element. This is not obligatory in a solution in which only the molded-out material region and the region adjacent thereto are connected together (in any manner) via the injected plastics material and/or the insert element and thus primarily the molded-out material region per se is stabilized in its position.

Moreover, the injection of thermoplastic material may be configured such that thermoplastic material is at least partially injected around the two edges spaced apart from one another, i.e. in each case one edge is enclosed by injected plastics material. The connection of the injections to the base carrier may be improved thereby.

In one variant, the at least one separation is configured by rolling, pressing, cutting, punching, deep-drawing and/or stamping in the base carrier. The shape of the separation in this case may be adapted according to the variant and the desired shape of the material region to be molded out. For example, the separation may be configured to extend in a linear or curved manner. The separation may also be configured for a material region to be folded. Thus the material region may have been folded repeatedly in order to protrude from the main plane as intended.

In one exemplary embodiment, the separation is provided on an outer edge of the base carrier. In other words, the separation may comprise at least one connection point with the edge of the base carrier or may merge with an edge of the base carrier. A separation, however, may also be arranged spaced apart from the outer edge of the base carrier. To this end, the separation is then provided in an internal region of the base carrier.

In one exemplary embodiment, at least one interface is configured for attaching and/or supporting at least one functional element to be secured to the carrier device, by the molded-out material region and, in particular, by the injection and/or the separate insert element. For example, by means of the injection and/or the separate insert element a bearing point or an interface may be configured for an element of a drive device, for a reinforcing element, for a crash element or deformation element, for an element of a guide device and/or for an element of a locking device. Moreover, at least one functional element, such as for example a reinforcing element, a crash element or deformation element, an element of a guide device and/or an element of a locking device may be configured by the injection and/or the separate insert element itself. Thus, in one exemplary embodiment a deformation element of the carrier device is configured by the injections. "Deformation element" in this case is understood as an element which at least partially dissipates a force acting on the carrier device, specifically by deformation of the deformation element.

According to a further variant, a reinforcement may be configured by the injection, said reinforcement extending between the material region molded out of the organo sheet and the adjacent region of the base carrier. For example, the reinforcement may be designed as a reinforcing rib. In one development, the reinforcement of the molded-out material region is supported against the adjacent region of the base carrier.

In one variant, the injection and/or the separate insert element entirely covers at least one surface of the molded-out material region. For example, a region between the material region and the main plane may be filled entirely by the injection and/or the separate insert element. Moreover, a region may also be filled up entirely by the injection and/or the separate insert element between the molded-out material region and an extension plane along which the base carrier portion, which forms the material region, extended before being molding-out. Preferably, injected thermoplastic material extends entirely over a wall formed by the molding-out and at least partially bordered by the at least one free space and as a result partially or entirely fills the free space.

The separate insert element may be produced from a metal material, in particular from light metal or sheet metal. In a variant, a separate insert element may be connected to the base carrier by adhesive bonding, ultrasonic welding, riveting, screwing and/or injected plastics material.

Moreover, it may be provided that a plurality of separations may be provided in the base carrier material, and in particular the organo sheet thereof, in order to mold out one or more material regions from the main plane and form the desired three-dimensional structures on the base carrier. In particular, at least two separations may be produced in the base carrier, so that a plurality of material regions (at least two) are molded out from the main plane in a manner according to the invention.

According to a further variant, the molded-out material region adjoins a plurality of separations which have been produced in successive operating steps on the organo sheet base carrier. In particular, in this case a free space may be formed by a plurality of separations, the material region adjoining said separations. In a variant, for example, the material region adjoins at least two separations spaced apart from one another and is molded out from the main plane forming at least two free spaces. In a development, the at least two separations are arranged here so as to extend parallel to one another. Moreover, the two free spaces may be at least partially filled with an injection of thermoplastic material and/or with a separate insert element and at least partially connected thereby.

In one variant, a channel is formed in the base carrier and the material region molded out from the main plane is arranged in the region of this channel. In this case, for example, a portion of the base carrier, which is used for molding out the material region protruding from the main plane after the separation of the base carrier material, forms a part of a channel which is open on one side. At the end of the production process for the carrier device, the molded-out material region is then recessed relative to adjacent regions of the channel or protrudes on the base carrier.

Irrespective of the arrangement in the region of a channel, the material region may be molded out from the main plane such that (on one side of the base carrier) a tab-like or pocket-like structure is formed thereby.

In one variant, at least one structural element is formed on the base carrier. "Structural element" is generally understood as a non-planar portion of the base carrier, in particular a raised portion or recess formed on the organo sheet of the base carrier. A structural element in this case may be configured by the molded-out material region and/or a region of the base carrier adjacent thereto. The adjacent region may, in particular, be that region of the base carrier which is adjacent to the separation and which is spaced apart from the molded-out material region via the free space and, in particular, is located in a plane different from the main plane of the base carrier. A structural element of the base carrier may, however, also be a base carrier portion which is shaped without any previously defined separation on the base carrier. By the extent of the shaping process of the organo sheet which corresponds to the invention, "undefined" or (better expressed) indeterminate separation are produced which in turn form free spaces for thermoplastic injections. Thus, for example, in this variant according to the invention a plurality of structural elements of the base carrier which are adjacent to one another may have the same geometric shape or may be designed to be at least partially different in terms of geometry. For example, a structural element may have a cylindrical shape, a pyramidal shape, a truncated pyramidal shape or a prism shape.

In a development, a plurality of structural elements may be arranged such that they form a region of the base carrier which is designed and provided to influence specifically the stiffness of the carrier device and/or to dissipate a force acting on the carrier device and, as a result, to counteract a malfunction of the carrier device. If this occurs by elastic or plastic deformation, at the same time an energy-absorbing deformation element is also defined thereby. For example, a plurality of structural elements which are arranged periodically or according to a predetermined pattern are provided in order to influence specifically the stiffness of the carrier device and/or in order to dissipate mechanical energy acting on the carrier device and thus to counteract a malfunction of the carrier device.

In one variant, the structural elements may have an identical external contour in cross section. In an alternative variant, the external contours of the structural elements may differ from one another with regard to shape and size in order to take account of the locally different mechanical requirements on the module carrier. It is also possible that a plurality of structural elements which are configured differently or identically, for example, are arranged adjacent or in succession in linear, curved or undulating rows. In one variant, a plurality of structural elements are arranged adjacent to one another in two spatial directions perpendicular to one another, or in succession along a circumference of a circle or an ellipse.

In one variant, two structural elements which are defined differently (i.e. structural elements of a first type, which are formed by a molded-out material region in the region of a separation and a structural element of a second type which is formed by a region of the base carrier adjacent thereto) are arranged alternately in succession in a direction of extension and in each case separated from one another by a separation. For example, in the region of a channel of the base carrier a plurality of material regions may be molded out according to one of the variants described above and in each case form a structural element. These structural elements (of the first type) then separate parts of the channel from one another which in turn represent structural elements (of the second type).

According to one variant, two structural elements in each case may adjoin an edge of a separation, wherein the two edges of the separation form edges spaced apart from one another of the at least one free space and are spaced apart from one another at least transversely to the main plane. In this case, the two structural elements together define a direction of extension along which they are arranged in succession. An injection of thermoplastic material connects the two structural elements together here, such that it at least partially fills the free space and is connected at least by a material connection to the two structural elements. In this case, the injection may extend away from the free space in the direction of extension into the respective structural element. Here, the injection preferably extends in each case at least sufficiently far into the respective structural element that the extent of the injection in the direction of extension in the respective structural element corresponds to at least 25% of the extent of the respective structural element itself in the direction of extension.

According to a further aspect of the invention, a method is proposed for producing a carrier device for functional elements of a motor vehicle.

In the method according to the invention, at least one base carrier which is substantially formed by an organo sheet and which extends along a main plane is provided. The base carrier in this case may already have molded portions, for example in the form of recesses or raised portions. In one variant, it may be an organo sheet blank which already has a desired edge contour by being cut to size and has been brought into a desired shape by a specific prior deformation. Optionally, functional elements (for example reinforcing structures) are also already pre-structured on the organo sheet blank.

According to the method according to the invention
at least one separation is formed in the base carrier,
a material region is molded out from the main plane on the separation, forming at least one free space, such that the molded-out material region is spaced apart from an adjacent region of the base carrier by at least one portion, and
the at least one free space is at least partially filled with an injection of thermoplastic material and/or with a separate insert element, such that the portion of the molded-out material region and the adjacent region are connected to one another thereby.

The molding out of the material region from the main plane may, in particular, encompass a shaping, preferably a thermal shaping of a portion of the base carrier and/or at least a folding of a portion of the base carrier. In this case, the portion of the base carrier which has been shaped and/or folded at least once is preferably formed from the organo sheet.

According to a further variant, in the method at least two separations may be formed in the base carrier, wherein at least two material regions which are spaced apart from one another spatially are molded out from the main plane.

Moreover, a plurality of separations (at least two) may be formed in the base carrier, the material region adjoining said separations, and the material region being molded out thereon from the main plane, forming at least one free space or a plurality of free spaces.

By a method according to the invention, a carrier device according to the invention may be produced so that the features and advantages of the carrier device according to the invention and the exemplary embodiments described above and hereinafter also apply to the variants of a production method according to the invention and vice versa.

BRIEF DESCRIPTION OF THE DRAWINGS

Further advantages and features of the invention are disclosed in the following description of exemplary embodiments with reference to the figures.

FIG. 1 shows a detail of an exemplary embodiment of a base carrier for a carrier device according to the invention with a separation.

FIG. 2 shows a detail of an exemplary embodiment of a base carrier for a carrier device according to the invention with material regions molded-out in a triangular manner.

FIG. 3 shows a detail of an exemplary embodiment of a base carrier for a carrier device according to the invention with a tab like molded-out material region arranged on the edge.

FIG. 6 shows a detail of an exemplary embodiment of a base carrier for a carrier device according to the invention with two protruding structural elements.

FIG. 6A shows the exemplary embodiment of FIG. 6 in cross section along a cutting line A-A visible in FIG. 6.

FIG. 6B shows the exemplary embodiment of FIG. 6 in cross section along a cutting line B-B visible in FIG. 6.

FIG. 7 shows a detail of an exemplary embodiment of a base carrier for a carrier device according to the invention with an insert element secured to the base carrier.

FIG. 8 shows a detail of an exemplary embodiment of a base carrier for a carrier device according to the invention with rows of systematically arranged structural elements.

FIG. 9A shows in enlarged scale a variant of a truncated pyramidal structural element.

FIG. 9B shows in enlarged scale a variant of a pyramidal structural element.

FIG. 10 shows by way of example a possible embodiment of a carrier device according to the invention.

FIGS. 11A and 11B show a variant of a base carrier according to the invention for a door module of a motor vehicle door with a view of an outer face and an inner face of the base carrier.

FIGS. 12A to 12B show enlarged details of the organo sheet of the base carrier of FIGS. 11A to 11B.

FIGS. 12C to 12D show the regions of the organo sheet shown in FIGS. 12A and 12B, with injections of thermoplastic material provided thereon.

FIG. 13A shows an enlarged detail of the organo sheet of the base carrier of FIGS. 11A to 11B with a view of a lower region for a guide rail provided on the base carrier.

FIG. 13B shows in a view coinciding with FIG. 13A the base carrier with the thermoplastic material injected on the organo sheet.

DETAILED DESCRIPTION

Figure 4:
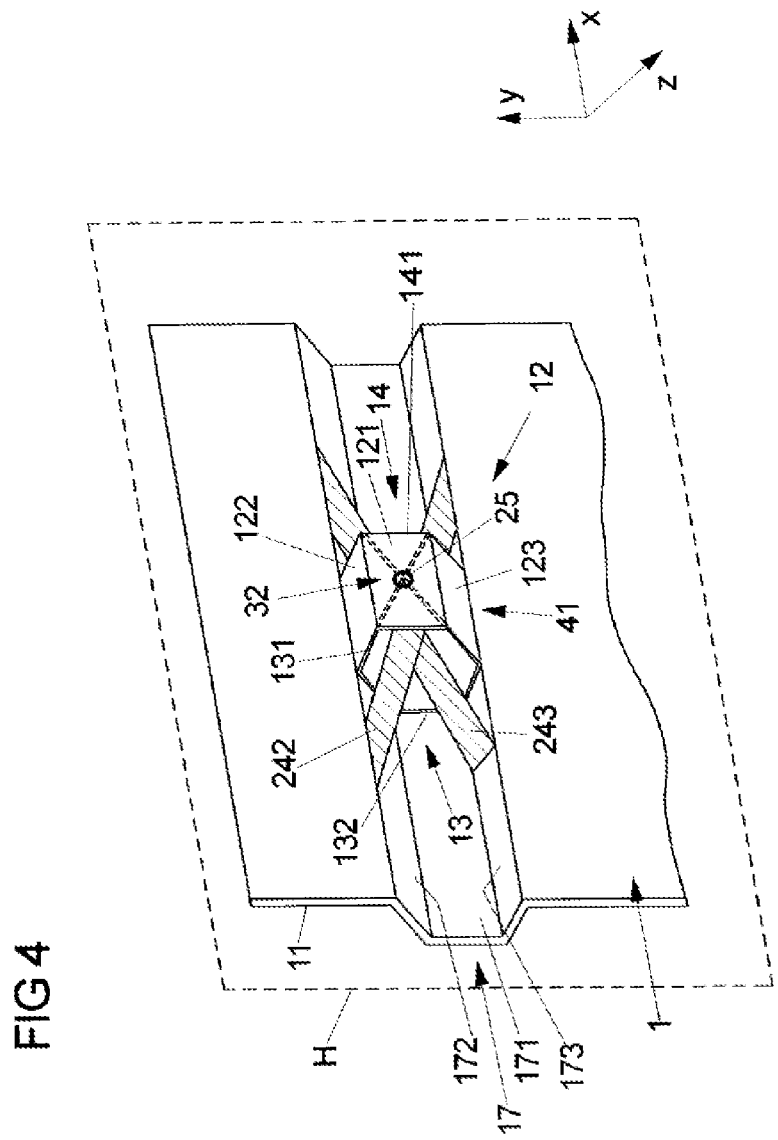
FIG. 4 shows a detail of an exemplary embodiment of a base carrier for a carrier device according to the invention with a prism-shaped structural element.

In FIGS. 1 to 9B a detail of exemplary embodiments for the base carrier 1 of a carrier device according to the invention are shown in each case. Here the base carrier 1 extends in each case along a main plane H and is surrounded by an outer edge 11. For example, the main plane H may be identical to an extension plane of an unprocessed organo sheet blank, the base carrier 1 being formed therefrom. One possible variant of a carrier device according to the invention is shown in FIG. 10. In this case, a carrier device is formed by a door module T for a motor vehicle door K, a plurality of functional elements, such as for example parts of a window lifter (such as a drive motor M), a lock SC or a loudspeaker L being arranged on the flat base carrier 1 of said door module generating a carrier surface 10 located in the main plane H.

A transverse direction z is defined by the direction perpendicular to the main plane H. Moreover, a vertically extending vertical direction y and a horizontally extending horizontal direction x are defined by the main plane H, which are located perpendicular to one another and perpendicular to the transverse direction z. Hereinafter, the three directions in each case are identified by coordinate axes in the figures. It should be understood that the three directions in this case are specified only to aid improved understanding and they serve primarily for creating relative references.

In the following figures, thermoplastic material which has been secured to the base carrier 1, is identified by hatching, unless this is described otherwise.

In FIG. 1 a first variant of a carrier device according to the invention is shown in a detail. A separation is arranged in the base carrier 1 which is planar and in this case relatively thin-walled, said separation being connected to a region of the outer edge 11 of the base carrier 1. The separation in this case extends substantially perpendicular to the outer edge 11 in the vertical direction y. The region of the outer edge 11 extends substantially in the horizontal direction x.

The separation which has been formed, for example, by cutting into the base carrier 1 defines two edges 131, 132. The first edge 131 forms an edge of a material region 12. The material region 12 is molded out from the main plane H. The second edge 132 is located in the main plane H and is thus spaced apart from the first edge 131.

The material region 12 is arranged on the edge side and in addition to the first edge 131 of the separation comprises a second edge which is configured by a portion of the outer edge 11 of the base carrier 1. On the remaining sides the material region 12 runs into regions of the base carrier 1 which extend in the main plane H.

The first edge 131 of the separation is curved by molding out the material region 12 from the main plane H and is spaced apart from the second edge 132 in the transverse direction z and in the horizontal direction x. Moreover, by means of the curvature the extent of the first edge 131 in the vertical direction y is smaller than that of the second edge 132. As a result, the portion of the outer edge 11 which is arranged in the region of the material region 12 is spaced apart from the horizontally extending region of the outer edge 11 in the vertical direction y, which is outside the material region 12.

For forming the material region 12 protruding from the main plane H, therefore, the organo sheet of the base carrier 1 has been shaped in the region of the separation. The free edges of the molded-out material region 12 in this case have an S-shaped path. By means of the molded-out material region 12 a tab-like structure is thus formed on the organo sheet base carrier 1.

A free space 13 which is at least partially filled by an injection 21 of thermoplastic material exists between the two edges 131 and 132 of the separation. A bottom surface of the free space 13 defined by the edges 131 and 132 extends relative to the transverse direction z slightly obliquely between the two edges 131 and 132 of the separation. Thus it is not perpendicular to the main plane H. The injection 21 is arranged in the free space such that an obliquely extending front wall connects the first edge 131 of the separation to a portion of the second edge 132 of the separation. The connected portion of the second edge 132 in this case opposes the first edge 131 in the vertical direction y. On the side remote from the injection 21, the material region 12 merges continuously with the main plane H.

A positive locking element 211 is integrally formed on the injection 21 filling the free space between the edges 131, 132 or is configured thereby. The positive locking element 211 in the present case is configured as a cuboidal projection made of thermoplastic material. The positive locking element 211 defines an interface for attaching and/or supporting a functional element. For example, a functional element may be plugged onto the base carrier 1 thereby. Alternatively or additionally, in the region of the injections 21 a functional element, such as for example a deflection piece for a window lifter control cable, may also be specified and, in particular, in turn configured by the injections 21.

In the present case, moreover, an additional interface 32 is configured on the material region 12, said interface consisting of an opening in the base carrier 1 and an injection 25 of thermoplastic material on the edge of the opening. The interface 32 may be designed and provided, for example, for securing a functional element to the base carrier 1. Accordingly, in the variant shown the material region 12, after the molding out thereof from the main plane H, forms two interfaces for securing functional elements to the base carrier 1 via the positive locking element 211 and the interface 32 with the continuous opening.

In FIG. 2, a further variant of a base carrier 1 is shown in detail for a carrier device according to the invention. In this case, the base carrier 1 comprises at least two first and second triangular material regions 12a, 12b which are molded out from the main plane H. The first material region 12a adjoins a separation in the material of the base carrier 1 and is molded out from the main plane H forming a free space 15a. The separation in this case extends substantially perpendicular to the outer edge 11 of the base carrier 1 in the vertical direction y. A first edge 151a of the separation forms an edge of the first triangular material region 12a. A second edge 152a of the separation extends in the main plane H and forms an edge of a region of the base carrier 1 which extends adjacent to the separation in the main plane H.

The first triangular material region 12a is flapped back from the main plane H in the transverse direction z. As a result, a folded edge 16a is configured in the base carrier 1. The folded edge 16a is located in the main plane H and forms a second edge of the first triangular material region 12a. The third edge of the first triangular material region 12a is configured by a flapped-back portion of the outer edge 11. Thus the first triangular material region 12a protrudes from the main plane H and is connected to the remaining organo sheet of the base carrier 1 via the folded edge 16a.

An injected reinforcing rib 241a made of thermoplastic material supports the first triangular material region 12a in its position. The reinforcing rib 241a in the present case is also configured to be triangular and connects the first triangular material region 12a to an adjacent region of the organo sheet base carrier 1.

The second triangular material region 12b of FIG. 2 is configured to be virtually identical to the first triangular material region 12a and in the present case is folded in the direction of the first triangular material region 12a. In contrast to the first triangular material region 12a no edge of the second triangular material region 12b is configured as an edge of a separation. Accordingly, the second triangular material region 12b is a folded-back corner region of the base carrier 1. Two of its edges are, therefore, in each case formed by portions of the outer edge 11 of the base carrier 1.

The third edge of the second triangular material region 12b is configured in a similar manner to the first triangular material region 12a as a folded edge 16b which is produced by flapping back the second triangular material region 12b from the main plane. Also, the second triangular material region 12b is fixed in its position by an injected reinforcing rib 241b made of thermoplastic material.

A first free space 15a extends in the main plane H between the folded edge 16a of the first triangular material region 12a and the second edge 152a of the separation. Similarly, a second free space 15b extends between the folded edge 16b of the second triangular material region 12b and the region in the main plane H in which the portions of the outer edge 11 of the second triangular material region 12b were located before being flapped back. The two free spaces 15a, 15b in each case are filled by injections 21a, 21b of thermoplastic material. The injections 21a and 21b extend in this case substantially in the main plane H.

Moreover, on the outer edge 11 of the base carrier 1 which in the vertical direction y forms the (upper) boundary of the base carrier 1 and extends in the horizontal direction x, an injection 26 of thermoplastic material is formed on the edge over the entire length of the section shown. This injection 26 forms an outer edge of the base carrier 1 in the main plane H. A three-dimensional structure which is formed by the triangular material regions 12a, 12b molded out and folded out, in particular, from the main plane H, is (additionally) stabilized by the thermoplastic injections 21a, 21b and 26. Moreover, a free space 15a, 15b produced by separating the base carrier material and folding up the base carrier portions is preferably sealingly closed again thereby.

On the first and second triangular material regions 12a and 12b in each case an interface 32a or 32b is additionally configured. An interface 32a or 32b in this case has an opening which is provided with an additional injection 25a or 25b of thermoplastic material. The respective associated reinforcing rib 24a or 24b extends at least partially behind the interface 32a, 32b.

In a further variant which I is not shown here, a material region such as for example one of the two triangular material regions 12a, 12b is fully folded over so that it bears against the organo sheet of the base carrier 1. In other words, in this case, a material region is flapped over by approximately 180° and fixed. As a result, for example, a doubling of the material may be achieved.

FIG. 3 shows in a detail a further variant of a base carrier 1 for a carrier device according to the invention. In this case two separations are provided in the base carrier 1, said separations extending parallel to one another and in each case being connected to the outer edge 11 of the base carrier 1. The separations extend substantially perpendicular to the outer edge 11 in the vertical direction y and encompass an individual tab-like material region 12 which is molded out from the main plane H. In this case two edges 131 and 132 of the first separation and two edges 141, 142 of the second separation are spaced apart from one another in the transverse direction z. The two edges 131, 132 of the first separation border a first free space 13 between the material region 12 and a region of the base carrier 1 adjoining on a (left-hand) side, whilst the two edges 141, 142 of the second separation border a free space between the material region 12 and a region of the base carrier 1 adjacent to a further (right-hand) side.

The material region 12 is molded out from the main plane H such that the first edge 131 of the first separation which defines the material region 12 on a first side, and the first edge 141 of the second separation which defines the material region 12 on a second side, extend parallel to one another. In this case, these two first edges 131 and 141 of the material region 12 have a curved shape. The portion of the outer edge 11 which is located between the two separations and extends substantially perpendicular thereto forms a second side of the tab-like material region 12.

The free spaces 13, 14 between the edges 131, 132 and 141, 142 extend in each case substantially in one plane perpendicular to the main plane H in the transverse direction z and the vertical direction y. The free spaces 13, 14 are also entirely filled with injections 21, 22 of thermoplastic material. Here the injections 21, 22 form once again in each case a front wall which connects together the two edges 131, 132 or 141, 142 spaced apart from one another of a first or second separation. As a result, a pocket-like structure which is defined by the molded-out material region 12 and the injections 21, 22 is stabilized in its position. The connection between the thermoplastic material of the injections 21, 22 and the base carrier material may be improved here by the edges 131, 132, 141, 142 being encapsulated by injection-molding.

In one development not shown here, the edges of a separation are additionally structured, for example slotted or serrated, in order to permit a further improved connection with injected thermoplastic material.

As a result of the deformation process the base carrier 1 is shortened in order to form the pocket-like structure by means of the material region 12 in the vertical direction y, i.e. in the present case on an upper end. For compensation of the length, on the edge a further injection 26 of thermoplastic material is provided on the upper edge of the material region 12. This thermoplastic injection 26 on the edge is configured such that an edge defined thereby terminates flush with the outer edge 11 of the adjacent regions of the base carrier 1. In other words, the outer edge 11 of the base carrier 1 which extends in the main plane H, is extended in the region of the molded-out material region 12 in a continuous manner through an injection 26 of thermoplastic material on the edge.

The pocket-like structure of the molded-out material region 12 which is provided with injections 21, 22 and 26 may serve, for example, as a through-opening for a functional element. For example, as a result a through-opening may be formed for an actuating rod or at least one cable.

A further exemplary embodiment of a base carrier 1 for a carrier device according to the invention is shown in detail in FIG. 4. In the detail of the base carrier 1 shown therein, an elongated channel 17 is formed. The channel 17 which is trapezoidal in cross section extends in this case substantially in the horizontal direction x and is bulged out from the main plane H counter to the transverse direction z. A channel base surface 171 is thus spaced apart from the main plane H counter to the transverse direction z and extends parallel thereto. Opposing, inclined (oblique) first and second channel side walls 172, 173 adjoin the channel base surface 171.

In the channel 17 a material region 12 is molded out from the main plane H on two separations parallel to one another. The two separations in this case extend substantially in the vertical direction y transversely to the direction of extension of the channel 17 and are spaced apart from one another in the horizontal direction x. The separations extend in each case transversely away from the channel 17. In other words, the separations in each case extend along the first channel side wall 172 over the channel base surface 171 and subsequently along the second channel side wall 173. The material region 12 is molded out from the main plane H of the base carrier 1 on the separations such that it protrudes counter to the channel 17 and separates the channel 17 into two parts interrupted by the material region 12. The material region 12 in this case has a contour which corresponds mirror-symmetrically to the contours of the channel 17 on the main plane H. Thus the (convex) material region 12, amongst other things, forms a planar surface 121 which extends parallel to the channel base surface 171 and is spaced apart from the main plane H identically to the channel base surface 171 of the (concave) channel 17 but in the opposing direction. Moreover, the material region 12 forms two inclined side walls 122, 123 which in each case have the same extent as the first and the second channel side walls 172, 173.

A first free space 13 and a second free space 14 are formed by the molded-out material region 12, in each case said free spaces being configured between the two edges 131, 132 and 141, 142 of a separation spaced apart from the main plane H. A first edge 131 or 141 is configured in each case on the material region 12 whilst an associated second edge 132 or 142 is configured in each case on an adjacent part of the channel 17. The free spaces 13 and 14 in a cross section perpendicular to the main plane H have a hexagonal bottom surface and the entire protruding raised portion defined by the material region 12 has a prism-shaped structure. The material region 12 molded out from the originally continuously extending channel 17 in this case forms a structural element 41 of the base carrier 1. This structural element 41 acts in a reinforcing manner transversely to the main plane H and with the adjacent parts of the channel 17 locally improves the stiffness of the base carrier 1.

In order to increase further the stiffness in the region of the structural element 41, said structural element is provided in each case with a reinforcing rib 242 or 243. The respective reinforcing rib 242 or 243 in this case engages through the structural element 41 and is formed from an injected thermoplastic material. The reinforcing ribs 242, 243, which respectively also extend at least in the horizontal direction x, in this case are injected onto the base carrier 1 such that an additional connection of the material region 12 with the organo sheet on both sides of the structural element 41 is produced thereby. The reinforcing ribs 242, 243 in each case are connected by a material connection to the material region 12, in particular to the planar surface 121 and a channel side wall 171, 172 or both opposing channel side walls 171, 172. The two reinforcing ribs 242, 243 in this case intersect in the region of a central point of the material region 12 on the planar surface 121 and namely on a lower face of the material region 12 facing the channel base surface 171. In the region in which the two reinforcing ribs 242, 243 intersect, a region is produced with an increased quantity of material. This region may be configured to receive a fastening element, such as for example a screw. To this end an interface 32 is configured in the planar surface 121 of the material region 12. This interface 32 is additionally provided on an upper face of the material region 12 with a thermoplastic injection 25. This additional thermoplastic injection 25 serves, for example, for maintaining low(er) tolerances for the diameter of the opening receiving the fastening element.

The two reinforcing ribs 242 and 243 extend in the present case at least sufficiently far into the structural element 41 that, in the direction of extension of the channel 17 along which the parts of the channel 17 functioning as structural elements and the molded-out material region 12 succeed one another, they have an extent such that the extent of a reinforcing rib 242, 243 in this direction of extension in the structural element 41 corresponds to at least 25% of the extent of the structural element 41 itself in this direction of extension. In the present case, the reinforcing ribs 242, 243 in the region of the structural element 41 formed by the material region 12, are markedly longer and extend over the entire width thereof.

Figure 5A:
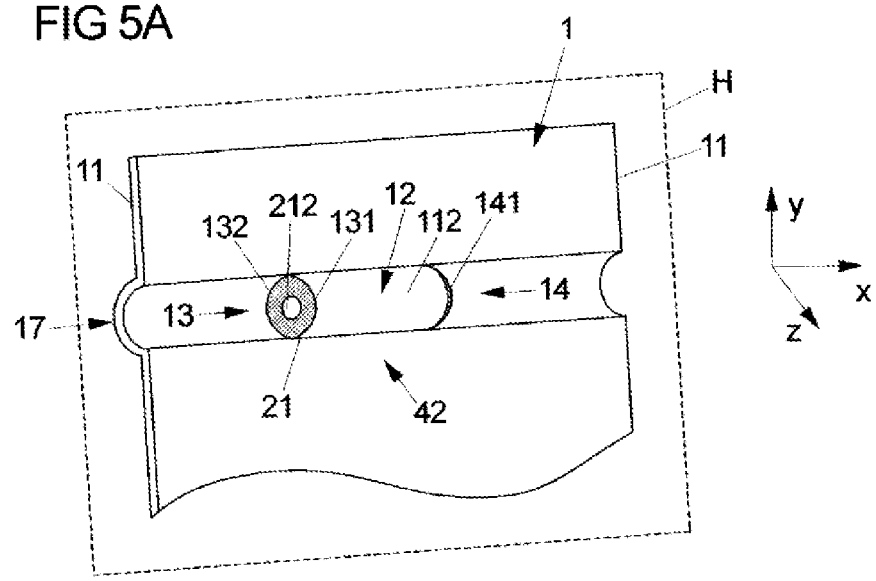
FIG. 5A shows a detail of an exemplary embodiment of a base carrier for a carrier device according to the invention with a cylindrical structural element.
Figure 5B:
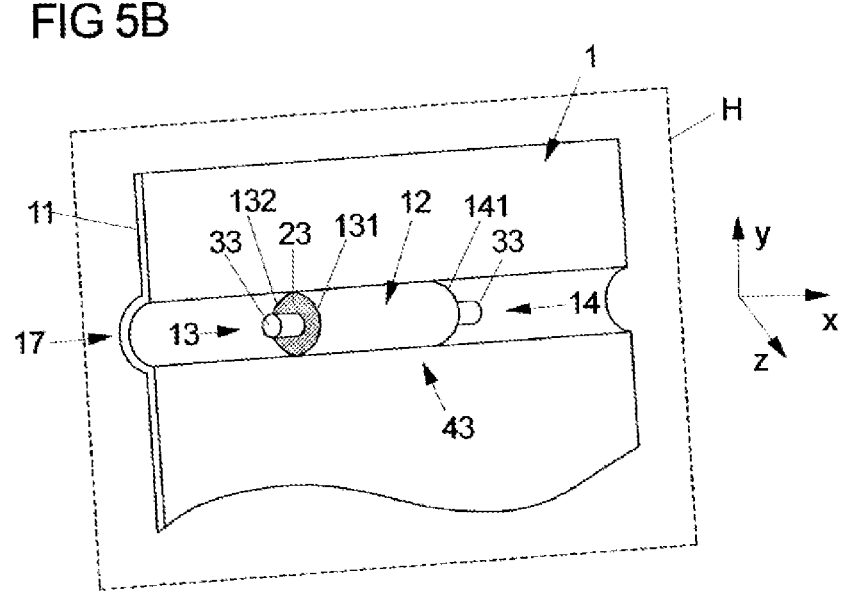
FIG. 5B shows a detail of an exemplary embodiment of a base carrier for a carrier device according to the invention with a cylindrical structural element and inserted insert element.

In FIGS. 5A and 5B two further variants of a base carrier 1 for a carrier device according to the invention are shown in detail. The variants of FIGS. 5A and 5B in terms of design substantially coincide with the variant of FIG. 4 so that reference is made to the relevant description.

In the base carrier 1 of FIGS. 5A and 5B once again an elongated channel 17 is molded, in the present case with a semi-circular cross section. Similar to the exemplary embodiment of FIG. 4, in the variant shown here in each case a material region 12 is bordered by two separations. The two separations extend substantially in the vertical direction y, transversely to the channel 17 and are spaced apart from one another in the horizontal direction x. The material region 12 in turn in each case is molded out from the main plane H such that its contour extends mirror-symmetrically to the contour of the adjacent parts of the channel 17.

The circular free spaces 13 and 14 which are produced by the molding-out of the respective material region 12 and which are spaced apart from one another in the direction of extension of the channel 17, in the present case are substantially closed by thermoplastic material in each case. In the present case, one structural element 42, 43 which appears to be circular cylindrical is formed in each case on the respective base carrier 1 by the material region 12 which is molded out from the main plane H at two separations and bulged in a convex manner.

In the variant of FIG. 5A in each case a central opening 212 is formed on injections 21 on the front face, in order to close a free space 13, 14. This opening 212 serves as an interface for securing a functional element or as a through-opening, for example for passing through a rod or at least one cable from one side of the base carrier 1 to the opposing side.

In the variant of FIG. 5B, an insert element 33 in the form of an additional cylindrical bar or pin is held on the structural element 43 via an injection 23 on the molded-out material region 12. The injection 23 extends in this case over the entire lower face of the material region 12 and forms thereby the structural element 43 as a cylindrical solid body on the base carrier 1. Thus in the present case the material region 12 is entirely back-molded with thermoplastic material. The insert element 33 extending parallel to the direction of extension of the channel 17 in this case is embedded in the back-molded plastics material and with one respective pin end protrudes from the structural element 43 on both sides. Each axially protruding pin end in this case may define an interface for the securing, in particular the (rotational) bearing, of a functional element.

FIG. 6 shows in detail and viewed together with the sectional views of FIGS. 6A and 6B a further variant of a base carrier 1 for a carrier device according to the invention. The planar base carrier 1 of the carrier device in this case has two structural elements 44a, 44b which are arranged spaced apart from one another in the horizontal direction x. The structural elements 44a and 44b in this case are produced identically in principle, but are configured so as to be rotated relative to one another by 180°. Thus a first repeatedly bent back tab-like material region 12a of the one structural element 44a substantially extends from bottom to top, whilst a second tab-like material region 12b of the other structural element 44b which has an identical length and is also repeatedly bent back extends from bottom to top.

A structural element 44a, 44b is configured in each case such that the respective material region 12a, 12b adjacent to a U-shaped separation is molded out from the main plane H of the base carrier 1, forming a free space 18a, 18b. The separation which in each case has two portions extending parallel to the vertical direction y and a portion extending in the horizontal direction x, in each case defines a tab-like base carrier portion with a rectangular bottom surface which is bent out of the main plane H to form the protruding material region 12a or 12b. Each material region 12a, 12b has a planar surface 121a, 121b which extends parallel to the main plane H and is spaced apart from said main plane in the transverse direction z. Moreover, each material region 12a, 12b has a surface 122a, 122b which extends obliquely to the planar surface 121a, 121b and which protrudes at an angle from the main plane H and connects the planar surface 121a, 121b to the region of the base carrier 1 extending in the main plane H.

Each of the separations for the material region 12a or 12b of FIGS. 6, 6A and 6B forms two edges 181a, 182a or 181b, 182b. Here, in each case a first edge 181a or 181b is assigned to the respective protruding material region 12a or 12b. A second edge 182a or 182b is assigned to the region of the base carrier 1 immediately adjacent to the respective material region 12a or 12b. Due to the spacing of the first edge 181a, 181b in the transverse direction z from the associated second edge 182a or 182b of the same separation, in each case a free space 18a or 18b is generated.

This free space 18b, 18b in each case is filled with thermoplastic material. In this case the molded-out material region 12a, 12b in each case is fully back-molded. An injection 23a or 23b of thermoplastic material provided therefor thus connects the material region 12a or 12b protruding from the main plane H with the regions of the base carrier 1 surrounding said material region at which the organo sheet of the base carrier 1 has been separated.

The two structural elements 44a and 44b of FIG. 6 have in each case a continuous cylindrical recess 231a, 231b which extends through the center of the injections 23a and 23b. The cylindrical recess 231a, 231b extends substantially in the horizontal direction x and forms a continuous opening through the structural element 44a, 44b. The structural elements 44a and 44b in this case are configured and arranged on the base carrier 1 such that, whilst they are spaced apart from one another in the horizontal direction x, the cylindrical recesses 231a, 231b are arranged coaxially. Thus the two structural elements 44a, 44b, for example, may be configured together to receive a preferably pin-shaped insert element which at least partially extends through the two cylindrical recesses 231a and 231b. The insert element in this case may serve as an interface for bearing a functional element.

Instead of inserting the insert element retrospectively into a recess 231a, 231b along an extension axis S, the insert element, which for example is produced from light metal or sheet metal, may also be injected, adhesively bonded, welded or riveted onto the material region 12 itself.

In FIG. 7 a further variant of a base carrier 1 for a carrier device according to the invention is shown in detail. Also in this case a material region 12 is molded out in the manner of a tab from the main plane H, forming a free space 18 in the region of a separation. The material region 12, similar to the structural elements 44a and 44b of FIGS. 6, 6A and 6B, has a planar surface 121, which in the present case is narrow and extends parallel to the main plane H, and a surface 122 extending in an inclined manner thereto, which are shown in hatched lines in FIG. 7.

Instead of a thermoplastic injection a cuboidal insert element 34 is arranged in a free space 18 bordered by edges 181, 182 of the material region 12 and the adjacent region of the base carrier 1. The insert element 34 is fixedly connected to the material region 12 and the adjacent region, preferably by a material connection and/or by positive locking. As a result, for example, tensile forces which act on the insert element 34 are introduced directly into the organo sheet. In this case, via the material region 12 which is molded out in the manner of a tab from the main plane H, and the closure of the free space 18 formed thereby by means of a separate insert element 34, optionally without injecting additional thermoplastic material, a three-dimensional structure is produced on the organo sheet of the base carrier 1 which is optimized in terms of load.

In FIG. 8 a further variant of a base carrier 1 for a carrier device according to the invention is shown in detail. The base carrier 1 has in this case a plurality of structural elements 45 and 46 arranged systematically adjacent to one another in a plurality of rows extending parallel to one another. In this case, structural elements 46 which are formed as parts of a channel 17 alternate with structural elements 45, which in each case are formed by a material region 12 molded out between two separations. The differently formed structural elements 45, 46 are in this case alternately arranged both in the horizontal direction x and also in the transverse direction y adjacent to one another.

For stabilizing, the structural elements 45, which are formed in each case by a molded-out material region 12, are provided either with injections 21 on the front face or injections 23 entirely back-molded behind the material region 12. By the concave and convex structural elements 45 and 46 alternating in the horizontal direction x and in the vertical direction y, the surface of the base carrier 1 is at least partially undulating. This three-dimensional undulating structure which is formed by means of material regions 12 molded out at separations and provided with injections 21 or 23 may serve for an improved absorption of crash forces. For additional reinforcing, additional reinforcing ribs made of thermoplastic material may be previously provided between adjacent convex and concave structural elements 45 and 46, for example, similar to the exemplary embodiment of FIG. 4.

An alternative embodiment of a structural element 47 or 48 by means of a molded-out material region 12 is illustrated in FIGS. 9A and 9B in each case in enlarged scale.

In the variant of FIG. 9A a truncated pyramidal structural element 47 is formed by a repeatedly bent back molded-out material region 12 and an injection 23 of thermoplastic material. In this case, the material region 12, which is molded out at two separations extending parallel to one another, is entirely back-molded by the plastics material so that the raised portion which is defined thereby with a base surface 471 extending substantially parallel to the main plane H and two side surfaces 472 extending obliquely thereto is stabilized by the injected plastics material. In FIG. 9A, in this case, by way of example two structural elements are shown in succession in the vertical direction y, said structural elements being separated from one another spatially by a planar region 19 of the base carrier 1.

In the variant of FIG. 9B a pyramidal structural element 48 is formed by a funnel-shaped molded-out material region 12 and an injection 23 of thermoplastic material. The three sides of the pyramidal structural element 48 which protrudes from the main plane H in a raised manner, therefore, on the one hand are formed by the injection 23 which entirely fills a free space produced and, on the other hand, by two surfaces 481 of the material region 12 extending respectively obliquely to the main plane H and at an angle to one another.

With reference to FIGS. 11A-11B, 12A-12D and 13A-13B a variant of a carrier device according to the invention with a base carrier 1 in the form of a sub-assembly carrier for a door module of a motor vehicle door is illustrated. The base carrier 1 serves in this case for securing a plurality of different functional elements such as, for example, a loudspeaker or parts of a window lifter for lifting and lowering a window pane of the motor vehicle door.

The perspective views of FIGS. 11A and 11B show in this case the base carrier 1 with a view of an outer face of the base carrier 1 facing a door outer panel as well as a view of an inner face of the base carrier 1 facing a door internal cladding. As is visible, in particular, with reference to FIGS. 11A and 11B, the base carrier 1 shown is substantially formed from an organo sheet O with a plurality of shaped regions and thermoplastic material injected thereon. Large-surfaced regions are injected on one edge of the organo sheet O, in particular, said regions forming on the finished base carrier 1 surface portions A1 and A5 on the edge. In each case, not only is a part of a circumferential sealing edge of the base carrier 1 molded via these surface portions A1 and A5, which are entirely produced from thermoplastic material, but also a plurality of fastening points for the connection of the base carrier 1 to a door structure. Moreover, a plurality of through-openings D1, D2 are provided thereon, for example, for passing through cables or rod parts through the base carrier 1 and/or for a tool for mounting the window lifter.

Moreover, in a central region through-openings D3, for example for attaching an airbag sensor, and through-openings D4 for a drive shaft of a window lifter and through-openings D5$a$ to D5$c$ for fixing a window lifter drive, are molded on the organo sheet O via injected thermoplastic material. The through-openings D5$a$ to D5$c$ in this case are grouped around the through-opening D4 in a bearing region LB for the window lifter drive.

Additionally, positioning pins P are molded from the injected thermoplastic material at different points for the positioning of the base carrier 1 on a door structure of the motor vehicle door. Via these positioning pins P the base carrier 1 may be held in position on the door structure until the base carrier 1 is fixed as intended. Moreover, via injected thermoplastic material (further) interfaces are also defined for securing functional elements to the base carrier 1, for example in the form of screw domes SD or in the form of bearing points AL for securing pulleys for deflecting a control cable of the window lifter.

Moreover, the organo sheet O forms in a central region two bases S1 and S2 which protrude on the outer face and which in each case serve as a stabilizing profile for a guide rail FS1* or FS2* provided on the base carrier 1. On such a guide rail FS1* or FS2*, in a manner known per se, a drive element which is connected to the window pane to be adjusted is displaceable in order to be able to raise and lower the window pane along the guide rails FS1* and FS2*. In this case, thermoplastic material is injected onto the bases S1 and S2, said thermoplastic material in each case molding a guide profile FP1 or FP2 of a guide rail FS1* or FS2*. Whilst a guide profile FP1 or FP2 serves for the sliding guidance of a drive element on the associated guide rail FS1* or FS2*, the forces which are present during operation are absorbed via the respective base S1 or S2 made of organo sheet O.

Reinforcing structures V with at least one and preferably a plurality of reinforcing webs or ribs are also molded at different points via thermoplastic material injected onto the organo sheet O. For example, such reinforcing structures V are provided in channels K1 and K2 of the organo sheet O formed on the inner face of the base carrier 1. These channels, due to the shaping of the bases S1 and S2 protruding on the opposing outer face, are configured on the inner face of the base carrier 1.

The region of the base carrier 1 at an upper end of the guide rail FS2* is illustrated in more detail with reference to the detailed views of FIGS. 12A to 12D. In this case FIGS. 12A and 12B, with a view of the outer face and inner face of the base carrier 1, initially show a detail of the organo sheet O present without the injected thermoplastic material. A bearing portion in the form of a bearing tab LL for the subsequent rotatable bearing of a pulley of the window lifter is configured on the portion made of organo sheet O adjacent to the base S2. A bore or a hole with a collar made of organo sheet O protruding on the inner face of the bearing tab LL is configured on the bearing tab LL. A bearing sleeve HS is inserted in this hole, said bearing sleeve being fixed in the hole by the injected thermoplastic material. The bearing sleeve HS serves, therefore, for receiving a bolt for the rotatable bearing and axial securing of the pulley. This is illustrated, amongst other things, in more detail in the enlarged view of FIGS. 12C and 12D.

The injected thermoplastic material surrounding the bearing tab LL in this region merges seamlessly with the plastics material of the surface portion A5 and the injected guide profile FP2. An offset between the structures configured on the organo sheet O is compensated via the injected thermoplastic material in this region by using the approach according to the invention. The bearing tab LL in this case is part of a material region which is molded out from the main plane of the base carrier 1 and which adjoins at least one separation of the organo sheet O in the form of a cut. By the local separation of the organo sheet O and the molding-out of the bearing tab LL, the edges of the bearing tab LL and the edges of regions of the organo sheet O adjacent thereto are spaced apart from one another. Additionally, the bearing tab LL and the regions of the organo sheet O adjacent thereto are not located in a common plane but are, in particular, offset to one another transversely to the main plane of the base carrier 1 generated by the organo sheet O. In this case according to FIGS. 12C and 12D the offset is compensated via the injected plastics material on the edge and a free space 13 present between the edges of the bearing tab LL and the regions of the organo sheet O adjacent thereto are entirely closed.

Moreover, the closing of the free space 13 in the organo sheet O and the connection of the edges spaced apart from one another in the region of the bearing tab LL takes place via an injection 22 of thermoplastic material, such that via the injection 22 a sealing channel is formed which extends in a linear manner and which adjoins adjacent portions of the base carrier 1 located in a sealing plane.

Moreover, by means of the thermoplastic material injected in the region of the bearing tab LL, a bearing point AL for a pulley is configured, as well as a reinforcing structure V with a plurality of reinforcing webs or ribs for locally reinforcing the base carrier 1 in this region.

With reference to FIGS. 13A and 13B an enlarged detail of the surface portion A1 made of thermoplastic material and a lower end of the guide rail FS1* are illustrated. In this case, FIGS. 9A and 9B illustrate, amongst other things, that on a region made of organo sheet O adjoining the base S1, a stop region is formed via a molded-out tab-like material region 12 of the organo sheet O. The material region 12 is cut free via a U-shaped cut into the organo sheet O and bent out transversely to the main plane generated by the organo sheet O. In order, on the one hand, to close the free space produced thereby in the organo sheet O and, on the other hand, to stabilize the material region 12 in its position, so that a stop element is formed thereby for defining an adjustment path of a drive element which is displaceable on the guide rail FS2*, an injection 22 is provided. This injection 22 entirely fills a free space formed by the molding-out of the tab-like material region 12 from the organo sheet O. The injection 22 in this case is additionally designed such that the material region 12 made of organo sheet O is entirely supported by the injection 22 and namely in the present case in that direction in which a drive element is displaced on the guide rail FS1* for lowering the window pane.

In all of the variants shown, material regions 12, 12a or 12b are provided on a base carrier 1 which substantially consists of an organo sheet, said material regions being molded out from the main plane H and being formed from portions of the base carrier 1, which due to separations of the base carrier material, for example by a corresponding cut or plurality of cuts in the organo sheet, may be simply bent up and/or folded. Via the respective material region 12, 12a, 12b, which is more easily deformable due to a separation, relatively complex structures are incorporated in the organo sheet, said structures then being stabilized and/or sealed via the subsequent injection of thermoplastic material. In this case, the individual three-dimensional structures on the base carrier 1 which are configured by means of these material regions 12, 12a, 12b, preferably form the interfaces or bearing points for functional elements of the carrier device or functional elements per se.

LIST OF REFERENCE NUMERALS

1 Base carrier
10 Carrier surface
11 Outer edge of base carrier
12, 12a, 12b Material region
121, 121a, 121b Planar surface of material region
122, 122a, 122b (Oblique) surface of material region
123, 123a, 123b Second (oblique) surface of material region
13 Free space
131 First edge of a separation
132 Second edge of a separation
14 Second free space
141 First edge of a second separation
142 Second edge of a second separation
151a, 152b First edge of a free space
152a, 152b Second edge of a free space
15a, 15b Free space
16a, 16b Folded edge
17 Channel
171 Channel base surface
172 First channel side wall
173 Second channel side wall
18, 18a, 18b Free space
181, 181a, 181b First edge of a separation
182, 182a, 182b Second edge of a separation
19 Region of base carrier adjacent to a structural element
21, 21a, 21b Injection
211 Injected positive locking element
212 Opening
22 Injection
23, 23a, 23b Injection
231a, 231b Opening
241a, 241b Injected reinforcement
242, 243 Reinforcing rib
25, 25a, 25b Injection
26 Injection on edge
31 Opening on edge
32, 32a, 32b Interface
33, 34 Insert element
41 Prism-shaped structural element
42, 43 Cylindrical structural element
44a, 44b Structural element
45 Cylindrical structural element
46 Concave structural element
47 Truncated pyramidal structural element
471 Base surface
472 Oblique surface
48 Pyramidal structural element
481 Oblique surface
A1, A5 Injected surface portion on edge
AL Injected bearing point
AS Protuberance
D1, D2, D3, D4 Through-opening
D5a, D5b, D5c
FP1, FP2 Guide profile
FS1*, FS2* Guide rail
H Main plane
HS Sleeve
K Motor vehicle door
K1, K2 Channel
L Loudspeaker
LB Bearing region
LL Bearing tab
O Organo sheet
P Positioning pin
R Edge of organo sheet
R1, R5 Edge portion
S Axis
S1, S2 Base/stability profile
SC Lock
SD Screw dome
T Door module
50 Reinforcing structure
x Horizontal direction
y Vertical direction
z Transverse direction

The invention claimed is:

1. A carrier device for a motor vehicle having a base carrier which is substantially formed by an organo sheet and which extends along a main plane,
wherein the base carrier has at least one separation on which a material region is molded out from the main plane while forming at least one free space, such that said material region is spaced apart from an adjacent region of the base carrier by at least one portion, wherein the at least one free space is at least partially filled with an injection of thermoplastic material, such that the portion of the molded-out material region and the adjacent region are connected to one another thereby.

2. The carrier device as claimed in claim 1, wherein the at least one free space is defined by at least two edges spaced apart from one another.

3. The carrier device as claimed in claim 2, wherein at least one of the at least two edges of the at least one free space is formed by an adjacent edge of the separation and wherein the at least two edges are spaced apart from one another at least transversely to the main plane, and
wherein at least one of the at least two edges of the at least one free space is formed by a folded edge which is formed by molding-out the material region.

4. The carrier device as claimed in claim 2, wherein the at least two edges of the at least one free space in each case are spaced apart therefrom transversely to the main plane.

5. The carrier device as claimed in claim 2, wherein the at least two edges of the at least one free space are at least partially connected together by the injection.

6. The carrier device as claimed in claim 1, wherein the at least one separation is configured by rolling, pressing, cutting, punching, deep-drawing and/or stamping in the base carrier.

7. The carrier device as claimed in claim 1, wherein at least one of the at least one separation is provided on an outer edge of the base carrier.

8. The carrier device as claimed in claim 1, wherein the injection forms an interface for attaching and/or supporting at least one functional element to be secured to the carrier device.

9. The carrier device as claimed in claim 1, wherein the injection forms a deformation element of the carrier device which is configured at least partially to dissipate mechanical energy acting on the carrier device by deformation and/or forms a reinforcement between the material region and the adjacent region of the base carrier.

10. The carrier device as claimed in claim 1, wherein the injection completely covers at least one surface of the molded-out material region so that the thermoplastic material extends over a wall formed by the molded-out material region and at least partially bordered by the at least one free space and in this case partially or entirely fills the free space.

11. The carrier device as claimed in claim 1, wherein the base carrier comprises a plurality of separations.

12. The carrier device as claimed in claim 1, wherein the base carrier comprises at least two separations and in addition to the material region molded out from the main plane comprises at least one further material region molded out from the main plane.

13. The carrier device as claimed in claim 11, wherein the material region adjoins a plurality of separations and is molded out from the main plane, forming at least one free space.

14. The carrier device as claimed in claim 1, wherein the material region is molded out from the main plane such that a tab-like structure is formed.

15. The carrier device as claimed in claim 1, wherein a channel is formed in the base carrier and the material region is molded out from the main plane in a region of the channel.

16. The carrier device as claimed in claim 1, wherein the material region and/or a region of the base carrier adjacent to the material region is molded out from the main plane such that a structural element of the carrier device is formed.

17. The carrier device as claimed in claim 16, wherein the carrier device comprises a region in which a plurality of structural elements are arranged in order to influence in a specific manner the stiffness of the carrier device and/or in order to dissipate mechanical energy acting on the carrier device and thus to counteract a malfunction of the carrier device.

18. The carrier device as claimed in claim 17, wherein the at least one free space is defined by at least two edges spaced apart from one another and the at least two edges of the at least one free space are formed by adjacent edges of the separation and are spaced apart from one another at least transversely to the main plane;
wherein a structural element adjoins one respective edge of the separation;
wherein the two structural elements together define a direction of extension, along which the two structural elements are arranged in succession, and an injection of thermoplastic material connects together the two structural elements such that the injection in each of the two structural elements extends in the direction of extension away from the free space and in this case in each case comprises an extent which corresponds to at least 25% of the extent of the respective structural element in the direction of extension.

19. The carrier device as claimed in claim 1, wherein the at least one free space is at least also partially filled with a separate insert element.

20. The carrier device as claimed in claim 1, the at least one separation is spaced apart from the outer edge of the base carrier.

21. The carrier device as claimed in claim 19, wherein the separate insert element is produced from a metal material and is connected to the base carrier by at least one of adhesive bonding, ultrasonic welding, riveting, screwing and/or encapsulation by thermoplastic injection-molding.

22. A method for producing a carrier device for functional elements of a motor vehicle, the method comprising:
forming a base carrier from an organo sheet, wherein the base carrier extends along a main plane and wherein at least one separation is formed in the base carrier,
molding a material region out from the main plane on the separation, forming at least one free space, such that the molded-out material region is spaced apart from an adjacent region of the base carrier by at least one portion, and
at least partially filling the at least one free space with an injection of thermoplastic material, such that the at least one portion of the molded-out material region and the adjacent region are connected to one another thereby.

* * * * *